United States Patent [19]

Kosaki et al.

[11] Patent Number: 5,531,324
[45] Date of Patent: Jul. 2, 1996

[54] CASE FOR FLAT OBJECTS

[75] Inventors: Shinichi Kosaki, Tokyo; Yoshito Tanaka; Tadahiro Kuwa, both of Osaka, all of Japan

[73] Assignees: Showa Yuki Kabushiki Kaisha; Hitachi Maxell Kabushiki Kaisha, both of Japan

[21] Appl. No.: 340,425

[22] Filed: Nov. 15, 1994

[30]     Foreign Application Priority Data

Dec. 27, 1993   [JP]   Japan ..................................... 5-348856

[51] Int. Cl.$^6$ ................................................. B65D 85/57
[52] U.S. Cl. .................... 206/449; 206/308.1; 206/308.3
[58] Field of Search ............................... 206/307, 308.1, 206/308.3, 312, 387.1, 387.15, 449, 454, 455, 456

[56]                References Cited

U.S. PATENT DOCUMENTS

| 3,860,248 | 1/1975 | Hunt et al. ............................ 206/308.3 |
| 4,413,734 | 11/1983 | Newcombe, Jr. ....................... 206/455 |
| 5,316,144 | 5/1994 | Habelt .................................. 206/387.1 |
| 5,385,235 | 1/1995 | Ikebe et al. ........................... 206/308.3 |
| 5,423,422 | 6/1995 | Boire et al. ............................ 206/454 |

FOREIGN PATENT DOCUMENTS 1-154190   10/1989   Japan .

*Primary Examiner*—Jimmy G. Foster
*Attorney, Agent, or Firm*—Nixon & Vanderhye

[57]                    ABSTRACT

A case for flat objects (e.g., shells containing disc-shaped recording media) includes a pair of case walls, a bottom wall and opposed side walls attached to the case walls. The opposed side walls maintain the case walls in parallel separated relationship and establish an open end of the case opposite to the bottom wall. The side walls are provided with respective L-shaped cut-out regions having edges which establish respective resilient tabs. One end of each tab is connected to a respective one of the side walls while the opposite terminal end of each tab is unconnected to the side wall. The resilient tabs each include a notch formed in their end which is connected to the side wall. The notch thereby establishes a hinge region to allow the resilient tabs to be deflected inwardly of the case and thereby be in resilient contact with a lateral edge of a flat object within the case. The notch causes the resilient tab to be extended lengthwise so that the unconnected terminal end thereof is partially overlapped with a respective edge of the cut-out region. In such a manner, the unconnected terminal ends of the tabs are maintained inwardly of their respective side wall. Due to the resiliency of the tabs and the terminal end being overlapped with its respective cut-out edge, the lateral surfaces of a flat object are held thereby so as to prevent its needless escape

11 Claims, 4 Drawing Sheets

CASE FOR FLAT OBJECTS

FIELD OF THE INVENTION

The present invention relates generally to cases for housing flat objects, for example disc-shaped recording media such as magneto-optical discs and VHD discs.

BACKGROUND OF THE INVENTION

One example of a conventional flat case is a case for video tape cassettes. Known examples of cases for housing shells in which magneto-optical discs are held include hinged hard cases. Such hinged hard cases may be opened and closed to allow access to the disc housed therein.

Such known cases of the prior art for housing disc-shaped objects and the like are typically comprised of two or three components. In this regard, since hinges are also typically required, conventional cases for flat objects tend to be complex and expensive, thus raising the selling price of the magneto-optical discs housed therein and making them somewhat "over packaged".

Therefore, in order to eliminate these problems, a previously proposed inexpensive flat case is described in Japanese Utility Model Laid-Open No. 1-154190 and includes overlapped tabs which are inwardly folded back at the ends of a thin thermoplastic sheet which exhibits some rigidity. More specifically, the overlapping tabs are formed on both sides of fold lines provided nearly in the center of a rigid thermoplastic sheet having a thickness of roughly 0.1 mm or more by inwardly folding back each of the opposing sides of the sheet a plurality of times. Opposed folded-back edges are thereby formed by having each of the overlapping tabs oppose each other. The overlapped tabs are then collectively adhered to one another by ultrasonic welding. A shell holding a disc-shaped recording medium such as a magneto optical disc (more simply referred to as a "shell") may then be inserted into and removed from an opening formed in the opposed sides of the folding lines.

However, although insertion and removal of the shell is relatively easy when using the conventional flat case as described above (i.e., since the shell is free inside the flat case), the shell can easily fly out of the flat case during transport, thus making it dangerous.

SUMMARY OF THE INVENTION

Broadly, the present invention is embodied in a case for shells and other flat objects whereby the lateral surfaces of the shell are engaged by resilient tabs so as to prevent the shell from inadvertently escaping from its flat case.

More specifically, the case of this invention includes a pair of case walls, a bottom wall and opposed side walls attached to the case walls. The opposed side walls maintain the case walls in parallel separated relationship and establish an open end of the case opposite to the bottom wall. The side walls are provided with respective L-shaped cut-out regions having edges which establish respective resilient tabs. One end of each tab is connected to a respective one of the side walls while the opposite terminal end of each tab is unconnected to the side wall.

The resilient tabs each include a notch formed in their end which is connected to the side wall. The notch thereby establishes a hinge region to allow the resilient tabs to be deflected inwardly of the case and thereby be in resilient contact with a lateral edge of a flat object within the case. Furthermore, the notch causes the resilient tab to be extended lengthwise so that the unconnected terminal end thereof is partially overlapped with a respective edge of the cut-out region. In such a manner, the unconnected terminal ends of the tabs are maintained inwardly of their respective side wall. Due to the resiliency of the tabs and the terminal end being overlapped with its respective cut-out edge, the lateral surfaces of a shell holding, for example, a 5-inch magneto-optical disc, that has been inserted into a flat case, are held thereby so as to prevent needless escape of the shell. The shell can, however, be removed from the case by pulling it out in opposition to the resiliency of the tabs.

BRIEF DESCRIPTION OF THE ACCOMPANYING DRAWINGS

DETAILED DESCRIPTION OF THE PREFERRED EXEMPLARY EMBODIMENTS

The following provides an explanation of the preferred exemplary embodiments of the present invention with reference to the drawings.

Figure 1:
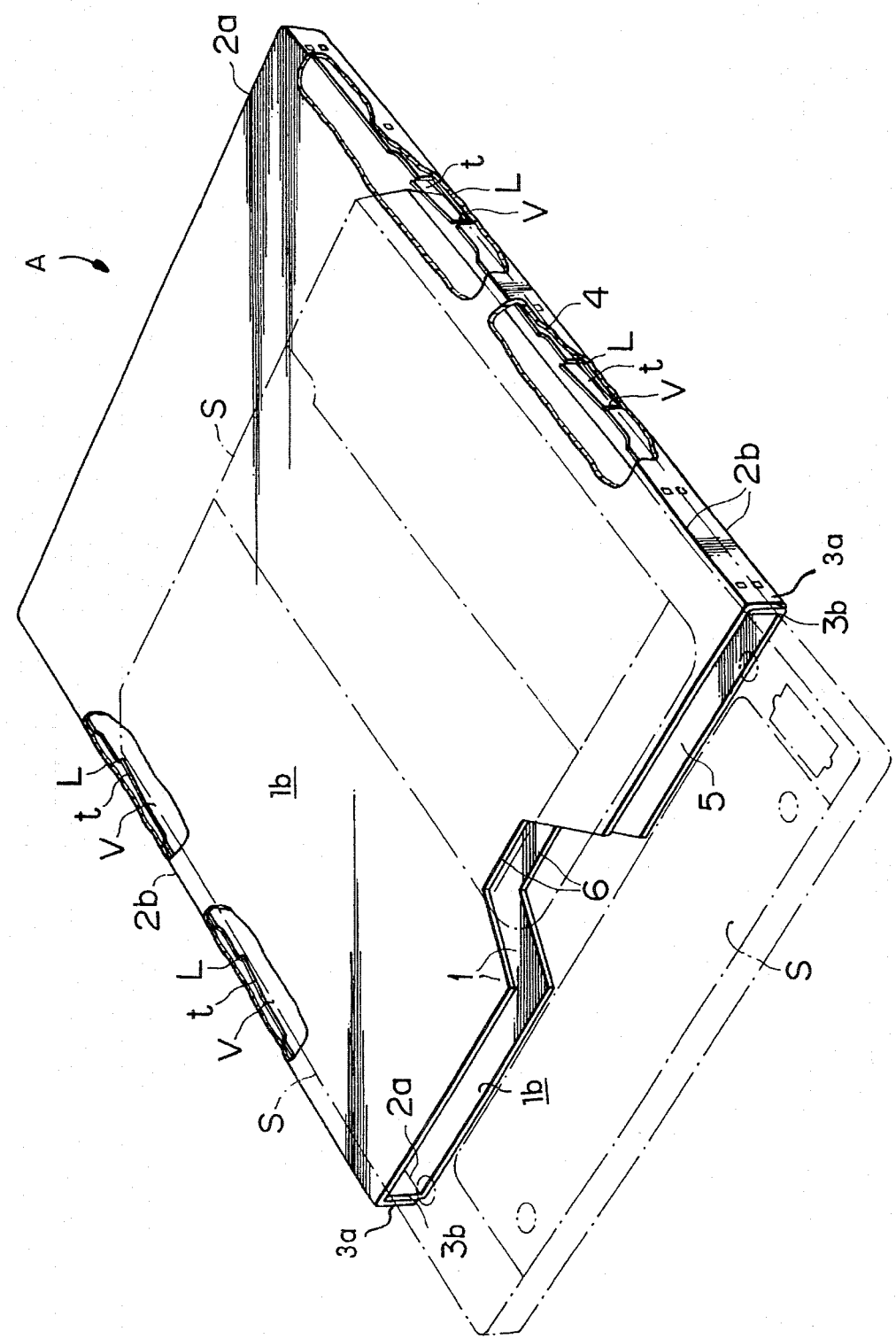
FIG. 1 is a perspective view showing an embodiment of the case for flat objects according to the present invention.
Figure 2:
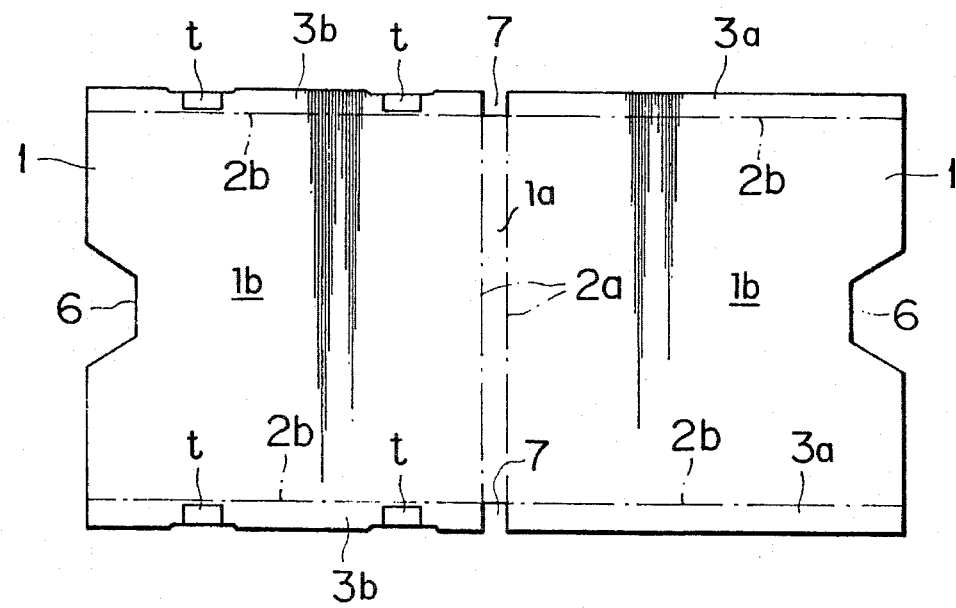
FIG. 2 is plan view showing a blanked sheet from which the case shown in FIG. 1 can be constructed.

The flat case A for housing a shell that holds a disc-shaped recording medium, such as a magneto-optical disc or VHD disc, is comprised of rigid thermoplastic sheet 1 (e.g., polypropylene or the like) having a thickness of roughly 0.4 mm or more (see FIG. 2). The width of the sheet 1 is slightly wider than the width of the shell S holding, for example, a 5-inch magneto-optical disc as shown in FIG. 1. The length of the sheet 1, however, is roughly twice the length of shell S as shown in FIG. 2. The sheet 1 is folded widthwise along two parallel fold lines 2a close to each other roughly in the center of the thermoplastic sheet 1 so as to establish a bottom wall 1 a and opposed pairs of case walls 1b.

Figure 3:
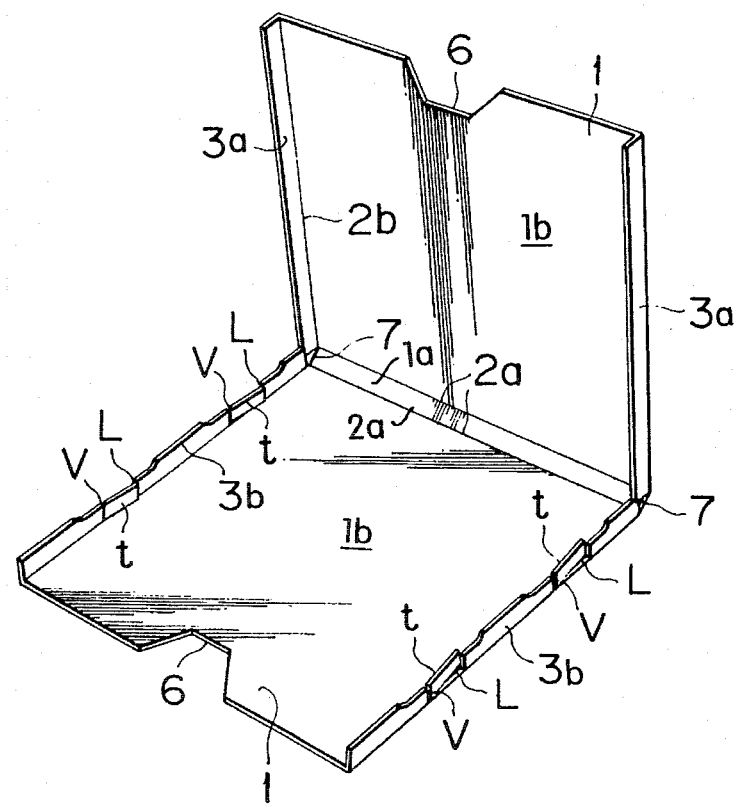
FIG. 3 is a perspective view during assembly of the case shown in FIG. 1 using the blanked sheet of FIG. 2.
Figure 4:
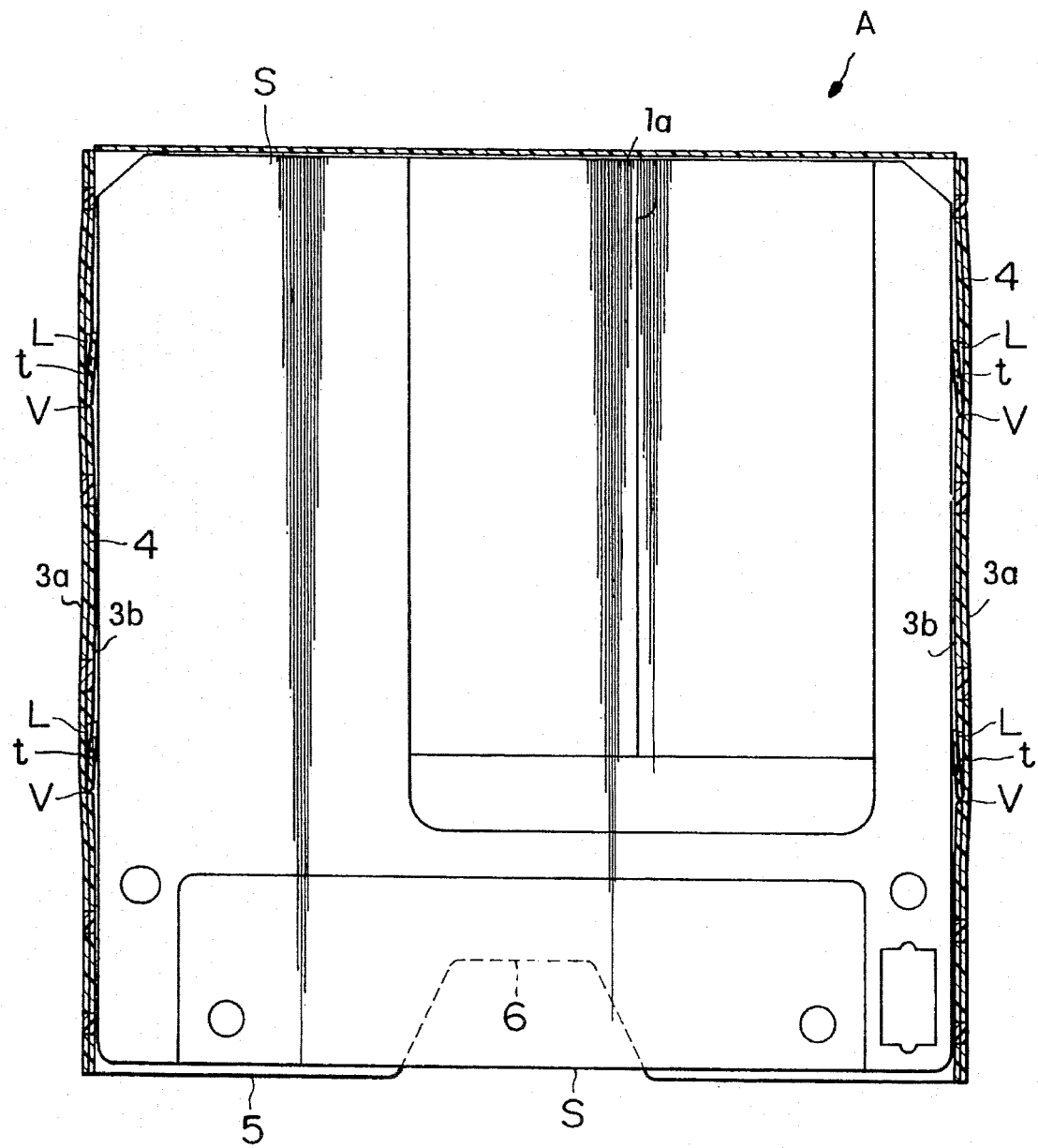
FIG. 4 is a horizontal cross-sectional overhead view showing an embodiment of the case according to the present invention.
Figure 5:
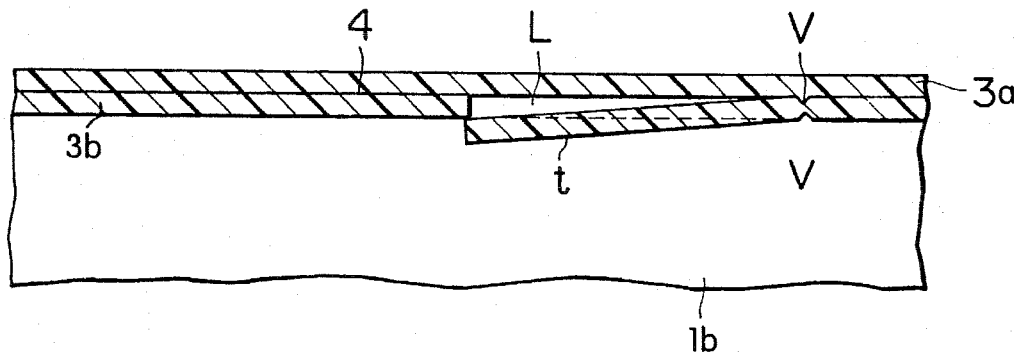
FIG. 5 is an enlarged, horizontal cross-sectional overhead view of an exemplary resilient tab according to the present invention.

As shown in FIG. 3, pairs of exterior and interior side edge walls 3a, 3b, respectively, are formed by inwardly folding the side edges of the case walls 1 b along respective fold lines 2b. The interior side edge walls 3b are further provided with L-shaped cut-outs L formed, for example, at two lengthwise-separated locations along the interior edge walls 3b. The L-shaped cut-outs L thereby establish a respective one of the resilient tabs t. As shown, one end of each of the tabs t is joined integrally to its respective side edge wall via a V-shaped notch V serving as a hinge, while the opposite terminal end of the tab t is unconnected to the side edge wall 3b. In addition, it will be observed (e.g., in FIGS. 5–7) that the unconnected terminal ends of cutout resilient tabs t partially overlap with an edge of the L-shaped cut-out L due to the slight extension of the tabs during formation of the V-shaped hinges V.

The case walls 1b are folded so as to be in substantial parallel disposition with respect to one another with the exterior side edge walls 3a being overlapped on the exterior side of the interior side edge walls 3b. The overlapped side edge walls 3a, 3b may thus be secured to one another, for example, via ultrasonic welding so as to form the side walls of the flat case A for housing shell S as shown in FIG. 1.

The end opposite to the bottom wall 1a of the case A is open (as shown by reference numeral 5) to allow insertion/removal of the shell S. Furthermore, each of the case walls 1b is provided with a notch 6 to allow the shell S to be grasped and thereby more easily removed from the interior of the case A. Lateral notched portions 7 are also provided at each lateral side of the bottom wall 1a so as to facilitate folding of the sheet 1a long the fold lines 2a and the side edge walls 3a, 3b along fold lines 2b as described previously.

Figure 6:
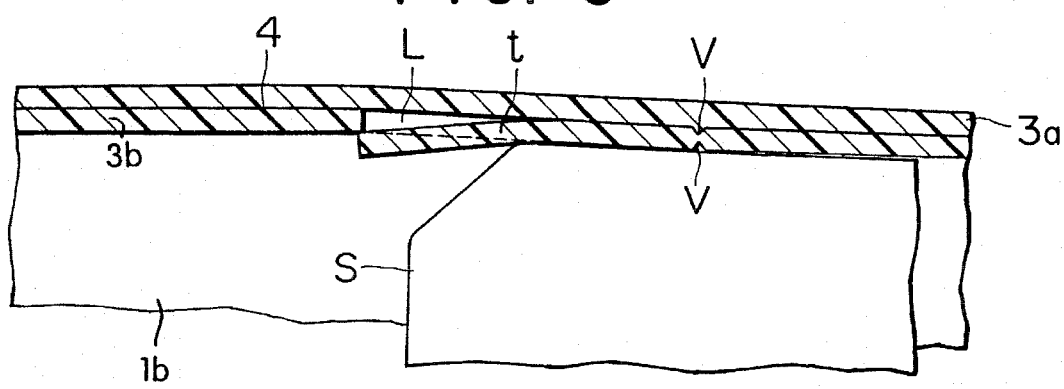
FIG. 6 is view similar to FIG. 5 but in a state in which a shell is being inserted into the case.
Figure 7:
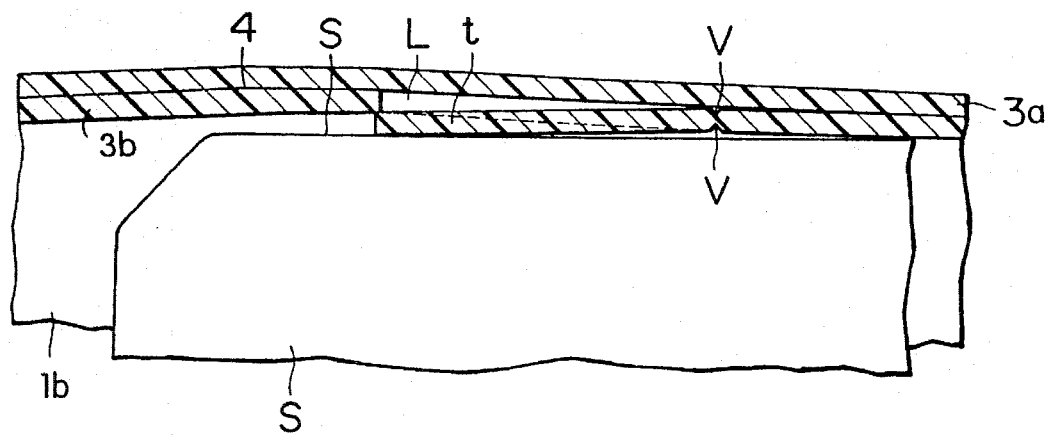
FIG. 7 is a view similar to FIG. 6, but a state wherein the shell has been further inserted into the case.

In order to house shell S holding a disc-shaped recording medium in the flat case A of this invention, the shell S is initially positioned within the opening 5 as shown in FIG. 1. By inserting the shell S into the interior of the case A, the leading end of the shell S will become engaged with a tab t. Such a state is shown in FIG. 6. Since the unconnected terminal end of the tab t extends slightly beyond the edge of the L-shaped cut-out L, the insertion force of the shell S will case the overlapped side edge walls 3a, 3b to spread apart to the outside as shown in FIG. 6 in opposition to the resiliency of the tab t. Continued insertion of the shell S into the case A will thereby case the terminal end of the tab t to make resilient contact with the lateral surfaces of shell S as shown in FIG. 7. The resiliency of the tabs t thereby cause the tabs t to be urged into contact with the lateral surfaces of the shell S thereby preventing the escape of shell S from inside f lat case A as shown in FIG. 2.

The shell S may be removed easily by grasping the shell in the region provided by cut-outs 6 in case walls 1b, and pulling the shell S outwardly against the resilient force of the tabs t.

As a result of the structural and functional attributes discussed above, the case according to the present invention is able to offer the following advantages. The shell S can be inserted easily into the case A since at least one cutout resilient tab t makes resilient contact in a direction that prevents escape of shell S from the case A. However, if the flat case A containing shell S is inadvertently moved and/or opening 5 is oriented downwardly, the tabs t restrain shell S inside the case A due to the locking action resulting from resilient contact of the tabs t against the lateral surfaces of the shell S. As a result, the shell S is unable to accidentally escape outside of or drop from the flat case thereby promoting increased safety against damage for the shell S housed thereby. Shell S can, however, be easily removed from the flat case A in opposition to the resiliency of the resilient tabs t.

The resilient tabs t can be provided simultaneously during stamp molding of the thermoplastic sheet 1. Thus, the present invention also offers numerous advantages of being able to be formed easily without the need for labor-intensive operations.

What is claimed is:

1. A flat case for housing a flat shell comprising:

a rectangular rigid thermoplastic sheet having two substantially centrally located parallel fold lines, said sheet being folded along said two parallel fold lines so as to form an integral bottom wall, a pair of opposed parallel case walls separated from one another by said bottom wall, and an open end opposite said bottom wall;

said case walls integrally including pairs of adjacently overlapped and adhered side walls folded at right angles relative to said case walls and extending between said open end and said bottom wall thereby forming lateral sides of said case; wherein one opposed pair of said side walls includes resilient tabs which make resilient contact with lateral surfaces of the flat shell inserted into the open end of the case; and wherein each of said resilient tabs establishes a respective L-shaped cut-out in said one pair of said side walls, and includes (i) one end integral with a respective side wall of said one opposed pair of said side walls, (ii) a V-shaped notch forming a hinge region at said one end of said resilient tab, and (iii) a terminal end opposite to said one end which is partially overlapped with an edge of a respective said L-shaped cut-out so that said resilient tabs are each positioned on an inner surface of said respective side wall.

2. The flat case as in claim 1, wherein said side walls are ultrasonically welded to one another.

3. A case for flat objects comprising:

a pair of case walls;

a bottom wall and opposed side walls attached to said case walls so as to maintain said case walls in parallel separated relationship and establish an open end of the case opposite to said bottom wall;

said side walls including respective cut-out regions having edges which establish respective resilient tabs, said tabs having one end connected to a respective one of said side walls and an unconnected terminal end opposite to said one end;

said resilient tabs each including a notch formed in said one end thereof so as to establish a hinge region to allow said resilient tabs to be deflected inwardly of the case and thereby be in resilient contact with a lateral edge of a flat object within the case, and to lengthwise extend said resilient tabs so that said unconnected terminal ends thereof are partially overlapped with respective ones of said edges of said cut-out regions to thereby maintain said terminal ends inwardly of said respective one of said side walls.

4. The case as in claim 3, formed of a thermoplastic sheet which is folded along respective fold lines to thereby integrally form said bottom and opposed side walls.

5. The case as in claim 4, wherein said side walls each include interior and exterior side edge walls ultrasonically welded to one another and formed integrally on first and second lateral edge regions of one and another of said case walls, respectively.

6. The case as in claim 3 or 4, wherein said side walls each include interior and exterior edge walls joined to one another and formed integrally on first and second lateral edge regions of one and another of said case walls, respectively.

7. The case as in claim 6, wherein said interior and exterior side edge walls are folded at right angles relative to said one and another of said case walls, respectively, so as to adjacently overlap one another.

8. The case as in claim 7, wherein said interior side edge walls include said cut-out regions.

9. The case as in claim 8, wherein said cut-out regions are in the form of an L-shaped cut-out.

10. The case as in claim 9, wherein said notch is V-shaped.

11. The case as in claim 3, wherein said notch is V-shaped.

* * * * *